(12) United States Patent
Jacobsson et al.

(10) Patent No.: US 8,323,016 B2
(45) Date of Patent: Dec. 4, 2012

(54) DEVICE AND METHOD FOR COMPRESSING AN EDGE OF A BUILDING PANEL AND A BUILDING PANEL WITH COMPRESSED EDGES

(75) Inventors: Jan Jacobsson, Viken (SE); Peter Wingardh, Viken (SE)

(73) Assignee: Valinge Innovation Belgium BVBA, Brussels (BE)

( * ) Notice: Subject to any disclaimer, the term of this patent is extended or adjusted under 35 U.S.C. 154(b) by 1052 days.

(21) Appl. No.: 11/521,439

(22) Filed: Sep. 15, 2006

(65) Prior Publication Data

US 2008/0120938 A1    May 29, 2008

(51) Int. Cl.
*E04F 13/16* (2006.01)
(52) U.S. Cl. .......... 425/374; 425/63; 425/107; 425/407; 425/412; 425/DIG. 115; 52/223.6
(58) Field of Classification Search .................. 425/101, 425/112, 116, 174.4, 301, 327, 363, 407, 425/63, 107, 374, 412, DIG. 115; 264/319; 52/223.6, 313, 314, 558, 592.1, 782.1
See application file for complete search history.

(56) References Cited

U.S. PATENT DOCUMENTS

| | | |
|---|---|---|
| 1,568,605 A | 1/1926 | Hough |
| 1,790,178 A | 1/1931 | Sutherland |
| 2,082,186 A | 6/1937 | Staude |
| 2,269,926 A | 1/1942 | Crooks |
| 2,497,837 A | 2/1950 | Nelson |
| 2,679,231 A | 5/1954 | Pomper et al. |
| 2,791,983 A | 5/1957 | Driskell |
| 2,811,133 A | 10/1957 | Heino |
| 2,872,712 A | 2/1959 | Brown et al. |
| 2,893,468 A | 7/1959 | Fieroh |
| 3,050,758 A | 8/1962 | Wilkins |
| 3,339,525 A | 9/1967 | Roberts |
| 3,341,351 A | 9/1967 | Brewer |
| 3,354,867 A | 11/1967 | Pomper |
| 3,440,790 A | 4/1969 | Nerem |
| 3,508,523 A | 4/1970 | Meerleer |
| 3,627,608 A * | 12/1971 | Steiner et al. .................. 156/211 |
| 3,825,381 A * | 7/1974 | Dunning et al. .............. 425/81.1 |
| 3,932,258 A * | 1/1976 | Brinkman et al. ............ 156/498 |
| 3,998,181 A | 12/1976 | Bellen |
| 4,004,774 A | 1/1977 | Houston |
| 4,054,477 A * | 10/1977 | Curran ........................... 156/197 |
| 4,076,880 A * | 2/1978 | Geschwender ............... 428/116 |

(Continued)

FOREIGN PATENT DOCUMENTS

CH    690 242 A5    6/2000

(Continued)

OTHER PUBLICATIONS

European Search Report issued in related EP 05 00 3173, The Hague, Jul. 11, 2005.

(Continued)

*Primary Examiner* — Joseph Del Sole
*Assistant Examiner* — Seyed Masoud Malekzadeh
(74) *Attorney, Agent, or Firm* — Buchanan Ingersoll & Rooney

(57) ABSTRACT

A device and method of producing a building panel with a compressed and curved edge including a press tool, a heat device and a lubricating device and a building panel with a curved edge produced by the device and method.

15 Claims, 3 Drawing Sheets

U.S. PATENT DOCUMENTS

| | | | |
|---|---|---|---|
| 4,084,996 A | | 4/1978 | Wheeler |
| 4,102,975 A | * | 7/1978 | Doerer .................. 264/322 |
| 4,147,448 A | * | 4/1979 | Jeffery .................. 404/124 |
| RE30,233 E | | 3/1980 | Lane et al. |
| 4,290,248 A | * | 9/1981 | Kemerer et al. .......... 52/309.16 |
| 4,612,074 A | | 9/1986 | Smith |
| 4,645,481 A | | 2/1987 | Klapp |
| 4,716,700 A | | 1/1988 | Hagemeyer |
| 4,751,957 A | | 6/1988 | Vaught |
| 4,850,838 A | * | 7/1989 | Wagner et al. ............. 425/101 |
| 5,096,408 A | * | 3/1992 | Bielfeldt .................. 425/371 |
| 5,111,579 A | * | 5/1992 | Andersen .................. 29/897.32 |
| 5,190,088 A | | 3/1993 | Thomassen |
| 5,213,819 A | * | 5/1993 | Bielfeldt .................. 425/371 |
| 5,349,796 A | | 9/1994 | Meyerson |
| 5,497,589 A | | 3/1996 | Porter |
| 5,582,906 A | * | 12/1996 | Romesberg et al. ............ 442/55 |
| 5,613,894 A | | 3/1997 | Delle Vedove |
| 5,641,553 A | * | 6/1997 | Tingley .................. 428/114 |
| 5,671,575 A | | 9/1997 | Wu |
| 5,755,068 A | | 5/1998 | Ormiston |
| 6,101,778 A | | 8/2000 | Martensson |
| 6,115,926 A | | 9/2000 | Robell |
| 6,126,883 A | * | 10/2000 | Troetscher et al. .......... 264/348 |
| 6,146,252 A | | 11/2000 | Martensson |
| 6,180,211 B1 | | 1/2001 | Held |
| 6,374,880 B2 | | 4/2002 | MacPherson |
| 6,446,405 B1 | | 9/2002 | Pervan |
| 6,532,709 B2 | | 3/2003 | Pervan |
| 6,617,009 B1 | | 9/2003 | Chen et al. |
| 6,679,011 B2 | | 1/2004 | Beck et al. |
| 6,766,622 B1 | | 7/2004 | Thiers |
| 6,769,218 B2 | | 8/2004 | Pervan |
| 6,786,019 B2 | * | 9/2004 | Thiers .................. 52/589.1 |
| 6,922,964 B2 | | 8/2005 | Pervan |
| 7,022,189 B2 | | 4/2006 | Delle Vedove et al. |
| 7,101,438 B2 | | 9/2006 | Suzuki |
| 7,137,229 B2 | | 11/2006 | Pervan |
| 7,584,583 B2 | | 9/2009 | Bergelin et al. |
| 2002/0014047 A1 | | 2/2002 | Thiers |
| 2002/0023702 A1 | | 2/2002 | Kettler |
| 2002/0100231 A1 | | 8/2002 | Miller et al. |
| 2003/0041545 A1 | | 3/2003 | Stanchfield |
| 2003/0101674 A1 | | 6/2003 | Pervan |
| 2003/0159385 A1 | | 8/2003 | Thiers |
| 2004/0031227 A1 | | 2/2004 | Knauseder |
| 2004/0035077 A1 | | 2/2004 | Martensson |
| 2004/0035078 A1 | | 2/2004 | Pervan |
| 2004/0108625 A1 | | 6/2004 | Moder |
| 2004/0177584 A1 | | 9/2004 | Pervan |
| 2004/0182036 A1 | | 9/2004 | Sjoberg |
| 2004/0255541 A1 | | 12/2004 | Thiers et al. |
| 2005/0028474 A1 | | 2/2005 | Kim |
| 2005/0138881 A1 | | 6/2005 | Pervan |
| 2005/0161468 A1 | | 7/2005 | Wagner |
| 2005/0235593 A1 | | 10/2005 | Hecht |
| 2006/0048474 A1 | | 3/2006 | Pervan et al. |
| 2006/0073320 A1 | * | 4/2006 | Pervan et al. ............. 428/292.4 |
| 2006/0099386 A1 | | 5/2006 | Smith |
| 2006/0110490 A1 | * | 5/2006 | Nien .................. 425/392 |
| 2006/0144004 A1 | | 7/2006 | Nollet |
| 2006/0179773 A1 | * | 8/2006 | Pervan .................. 52/592.1 |
| 2006/0260253 A1 | * | 11/2006 | Brice .................. 52/588.1 |
| 2007/0175143 A1 | | 8/2007 | Pervan et al. |
| 2007/0175148 A1 | | 8/2007 | Bergelin et al. |
| 2007/0175156 A1 | | 8/2007 | Pervan et al. |
| 2007/0232205 A1 | * | 10/2007 | Delle Vedove ............. 451/309 |
| 2008/0000179 A1 | | 1/2008 | Pervan et al. |
| 2008/0000183 A1 | | 1/2008 | Bergelin et al. |
| 2008/0000417 A1 | | 1/2008 | Pervan et al. |
| 2008/0005989 A1 | | 1/2008 | Pervan et al. |
| 2008/0034701 A1 | | 2/2008 | Pervan |
| 2008/0066425 A1 | | 3/2008 | Jacobsson et al. |
| 2008/0263975 A1 | | 10/2008 | Mead |
| 2009/0155612 A1 | | 6/2009 | Pervan et al. |
| 2010/0300030 A1 | | 12/2010 | Pervan et al. |
| 2011/0146188 A1 | | 6/2011 | Wallin et al. |

FOREIGN PATENT DOCUMENTS

| | | |
|---|---|---|
| CN | 2095236 U | 2/1992 |
| DE | 199 07 939 C1 | 5/2000 |
| DE | 100 32 204 C1 | 7/2001 |
| DE | 202 06 460 U1 | 8/2002 |
| DE | 203 14 850 U1 | 1/2004 |
| DE | 203 17 527 U1 | 1/2004 |
| DE | 20 2004 001 038 U1 | 4/2004 |
| DE | 103 43 441 B3 | 5/2005 |
| DE | 20 2005 006 300 U1 | 7/2005 |
| EP | 0 487 925 A1 | 6/1992 |
| EP | 0 661 135 B1 | 12/1998 |
| EP | 1 048 423 A2 | 11/2000 |
| EP | 1 215 352 A2 | 6/2002 |
| EP | 1 228 812 A1 | 8/2002 |
| EP | 1 338 344 A2 | 8/2003 |
| EP | 1 357 239 A2 | 10/2003 |
| EP | 1 357 239 A3 | 10/2003 |
| EP | 1 437 457 A2 | 7/2004 |
| EP | 1 593 795 A1 | 11/2005 |
| EP | 1 691 005 A1 | 8/2006 |
| FR | 2 846 023 A | 4/2004 |
| GB | 1 394 621 A | 5/1975 |
| GB | 2 256 023 A | 11/1992 |
| JP | 48-071434 A | 9/1973 |
| JP | 49-031028 B | 8/1974 |
| JP | 50-151232 A | 12/1975 |
| JP | 55-099774 U | 7/1980 |
| JP | 57-162668 A | 10/1982 |
| JP | 57 185110 A | 11/1982 |
| JP | 6-280376 A | 10/1994 |
| JP | 8-033861 A | 2/1996 |
| JP | 8-086080 A | 4/1996 |
| JP | 9-88315 A | 3/1997 |
| JP | 2000-079602 A | 3/2000 |
| JP | 2000-226932 A | 8/2000 |
| JP | 2001-179710 A | 7/2001 |
| JP | 2001-254503 A | 9/2001 |
| JP | 2001-260107 A | 9/2001 |
| JP | 2002-371635 A | 12/2002 |
| JP | 2003-126759 A | 5/2003 |
| JP | 2003-200405 A | 7/2003 |
| JP | 2004-027626 A | 1/2004 |
| KR | 10 2007 000322 A | 1/2007 |
| SE | 525 661 C2 | 3/2005 |
| SU | 1680359 A1 | 9/1991 |
| WO | WO 94/26999 A1 | 11/1994 |
| WO | WO 97/19232 A1 | 5/1997 |
| WO | WO 97/47834 A1 | 12/1997 |
| WO | WO 01/02103 A2 | 1/2001 |
| WO | WO 02/055809 A1 | 7/2002 |
| WO | WO 02/055810 A1 | 7/2002 |
| WO | WO 02/060691 A1 | 8/2002 |
| WO | WO 03/012224 A1 | 2/2003 |
| WO | WO 03/025307 A1 | 3/2003 |
| WO | WO 03/070384 A1 | 8/2003 |
| WO | WO 03/078761 A1 | 9/2003 |
| WO | WO 03/099461 A1 | 12/2003 |
| WO | WO 2004/053257 A1 | 6/2004 |
| WO | WO 2004/053257 A8 | 6/2004 |
| WO | WO 2005/068747 A1 | 7/2005 |
| WO | WO 2005/077625 A1 | 8/2005 |
| WO | WO 2005/110677 A1 | 11/2005 |
| WO | WO 2006/008578 A1 | 1/2006 |
| WO | WO 2006/031169 A1 | 3/2006 |
| WO | WO 2006/038867 A1 | 4/2006 |
| WO | WO 2006/066776 A2 | 6/2006 |
| WO | WO2006/088417 A2 | 8/2006 |
| WO | WO 2006/088417 A2 | 8/2006 |
| WO | WO2006/088417 A3 | 8/2006 |
| WO | WO 2006/113757 A2 | 10/2006 |

OTHER PUBLICATIONS

International Search Report and Written Opinion issued in related PCT/SE2006/000209, ISA Stockholm, SE, Aug. 15, 2006.

U.S. Appl. No. 13/045,631, Pervan, et al.

U.S. Appl. No. 13/046,011, Bergelin, et al.
Pervan, Darko, et al., U.S. Appl. No. 13/045,631, entitled "Floorboards with Decorative Grooves," filed in the U. S. Patent and Trademark Office on Mar. 11, 2011.
Bergelin, Marcus, et al., U.S. Appl. No. 13/046,011, entitled "Resilient Groove," filed in the U. S. Patent and Trademark Office on Mar. 11, 2011.

Bergelin, Marcus, et al., U.S. Appl. No. 13/552,357 entitled "Resilient Groove," filed in the U.S. Patent and Trademark Office on Jul. 18, 2012.
Official Action issued Jun. 20, 2012 by the U.S. Patent and Trademark Office in U.S. Appl. No. 11/822,694 (11 pages).

* cited by examiner

Prior Art

DEVICE AND METHOD FOR COMPRESSING AN EDGE OF A BUILDING PANEL AND A BUILDING PANEL WITH COMPRESSED EDGES

AREA OF INVENTION

The present invention generally relates to a device and a method of compressing an edge of a building panels, especially floorboards, which have a wood fibre based core and a decorative layer, to provide curved edge portions. More particularly, the present invention relates to interlocked building panels with compressed edge portions located below the panel surface. The invention relates to panels with such edge portions and to a method and device to produce such panels.

BACKGROUND OF THE INVENTION

In particular, yet not restrictive manner, the present application concerns a device and a method of producing a laminate floor panel with a curve shaped and compressed edge. However, the application is as well applicable to building panels in general. More particularly, the application relates to the type of floor panels with a wood fibre based core, e.g. HDF, MDF, particleboard, plywood, a decorative layer and a mechanically locking system for horizontal and/or vertical locking produced by the method and device.

A device, method and floor panel of this type is presented in WO2006/088417, which discloses a device and method to compress the edges of a laminate floor panel to provide a laminate floor panel with curve shaped edges looking like a solid wood floor panel with bevelled edges.

The contents of WO2006/088417 and U.S. Ser. No. 10/906,356 are hereby incorporated herein by reference.

SUMMARY

The invention aims at an improved device and a method of producing building panels, especially floorboards, with a curved edge portion made in one piece with the decorative layer, which could be produced with high speed. The invention 5 also makes it possible to produce deeper curved edge portion compared to the known technology.

An additional purpose of this invention is to provide building panels comprising a decorative layer and a curved edge portion, produced with the device and the method.

A device, method and floor panel of this type is known from WO2006/088417, which discloses a device and method to compress the edges of a laminate floor panel, to provide a laminate floor panel with a curve shaped edge. The known device comprises a heat device and a press tool for heating and compressing the edge part of the panel.

The known method comprises the steps of:
Applying the decorative layer on the core to form a building element.
Cutting the building element into building panels.
Applying heat and pressure on the surface of an edge portion of the building panel such that the core under the decorative layer is compressed and the surface layer is permanently bent towards the rear side of the core.

A drawback of this known device and method is that cracks arise in the decorative layer if the pressure is applied to fast or if the degree of compression is to high.

One embodiment according to the invention comprises a 30 heat device, a press tool and a lubricating device for produce building panels with high speed.

Advantageously, the tool is arranged rotatable and is configured to rotate when applying the pressure on the edge of the building panel.

Preferably, the lubricating device is arranged to apply the lubricate additive at the press tool. The lubricate additive may be of any type of grease or oil easy to wipe of from the present type of decorative surface. A preferred example is synthetic teflon oil, but it is also possible to use a mineral and an organic oil with the same fluid and lubricating properties, which is possible to remove from the decorative surface.

Preferably, the heating device comprises an IR (infra red) heat element. In a preferred embodiment also the tool is heated.

Preferably, the shape of the tool comprises an elliptic groove, with a larger radius in a plane parallel to decorative surface and consequently the smaller in a plane vertical to the decorative surface. This results in a bevel, which looks deeper/bigger.

Preferably, the surface of the tool is grinded. This results in lower friction between the decorative surface and the press tool, resulting in fewer cracks in the decorative surface.

An object of the invention is to provide an improved method to produce a building panel with a compressed edge. One embodiment of the invention includes the method comprising:

Heating an edge of the building panel.
Lubricating the edge of the building panel or an press tool
Compressing the edge of the building panel with the press tool Advantageously, the method may also comprises heating of the tool.

Preferably, the method comprises moving the building panel relative the tool via a conveyor. The speed of the conveyor is preferably more than 50 m/s and most preferably 100 m/s or higher.

Another object is to provide an improved building panel with a curved edge, produced by the device and method afore mentioned. The building panel preferably has an elliptic outer edge. Advantageously, the core at the curve shaped edge is compressed more than 0.5 mm and most preferably more than 0.7 mm. A preferred range of compression is between 0.5 mm to 1 mm. With the method and the device according to the invention it is possible to produce a building panel with such a deep compression without cracks in the decorative surface.

Building panels with a curved edge portion are described in WO2006/088417. Two main types of curved edges are shown in WO2006/088417, the old type, which involves cutting of a part of the core at the edge of the building panel or pressing the whole building panel, forming the curve shape, and a new type involving compression of the edges. The two types may look the same but the new type has a compressed core, with higher density, at the edge. WO2006/088417 also disclose a measuring method for distinguishing the two types. A building board according to the invention is possible to distinguish from the old types with the measuring method described in WO2006/088417 and from the new type that there are fewer or no cracks in the decorative surface at the curved edge. The difference is increased with larger radius and degree of compression.

All references to "a/an/the [element, device, component, means, step, etc]" are to be interpreted openly as referring to at least one instance of said element, device, component, means, step, etc., unless explicitly stated otherwise.

DESCRIPTION OF EMBODIMENTS OF THE INVENTION

As represented in FIGS. 2-5, an embodiment of the invention relates to a device and a method of producing a building panel with a compressed and curved edge and a building panel produced by the device and method.

Figure 1A:
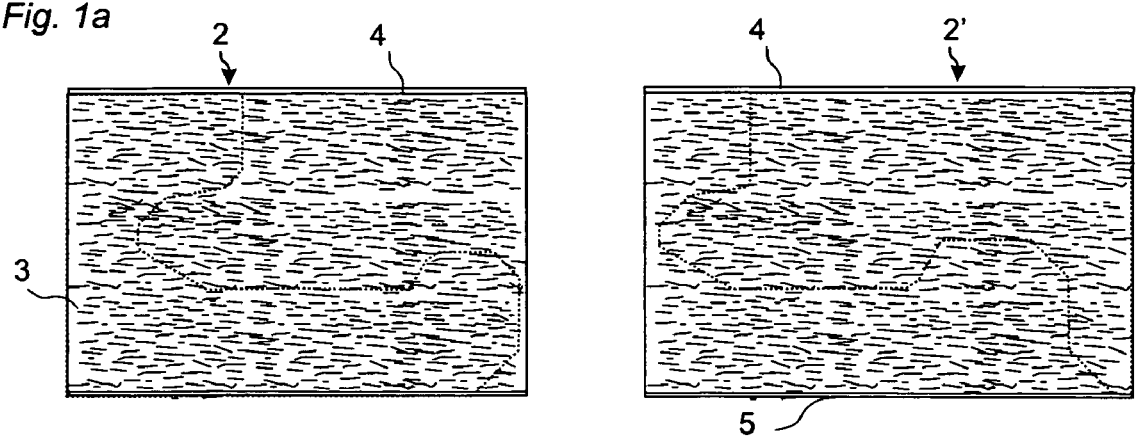
FIGS. 1a-c illustrate a device and method according to known technology.
Figure 1B:
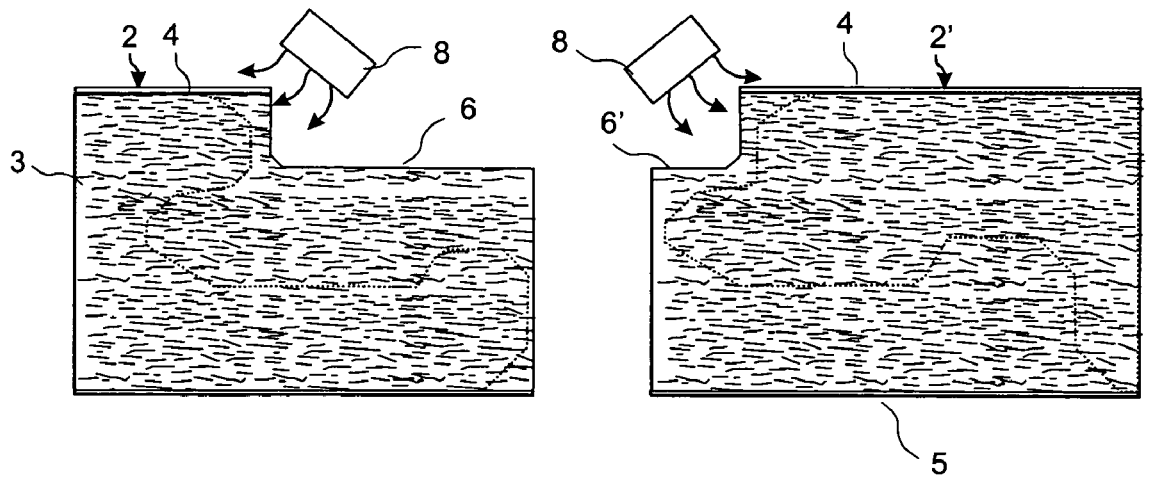
Figure 1C:
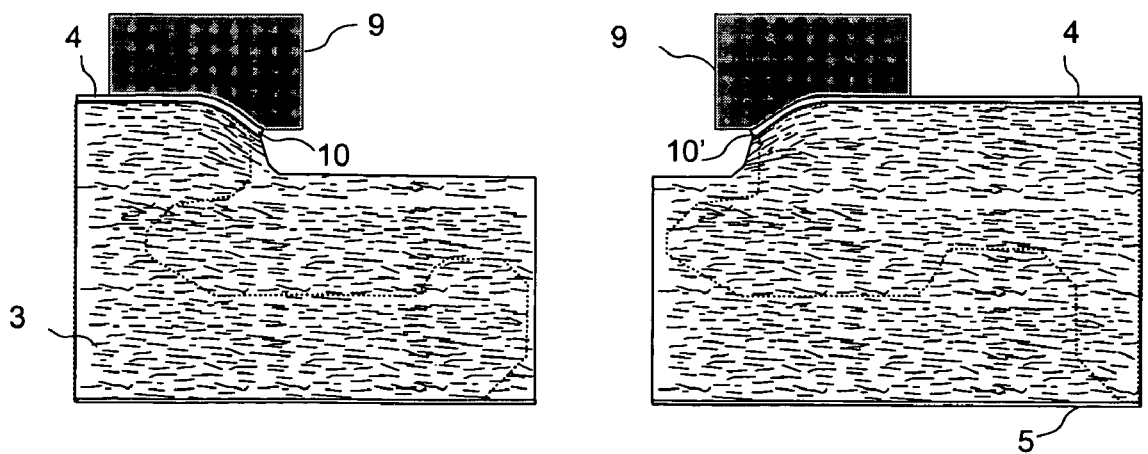
Figure 2:
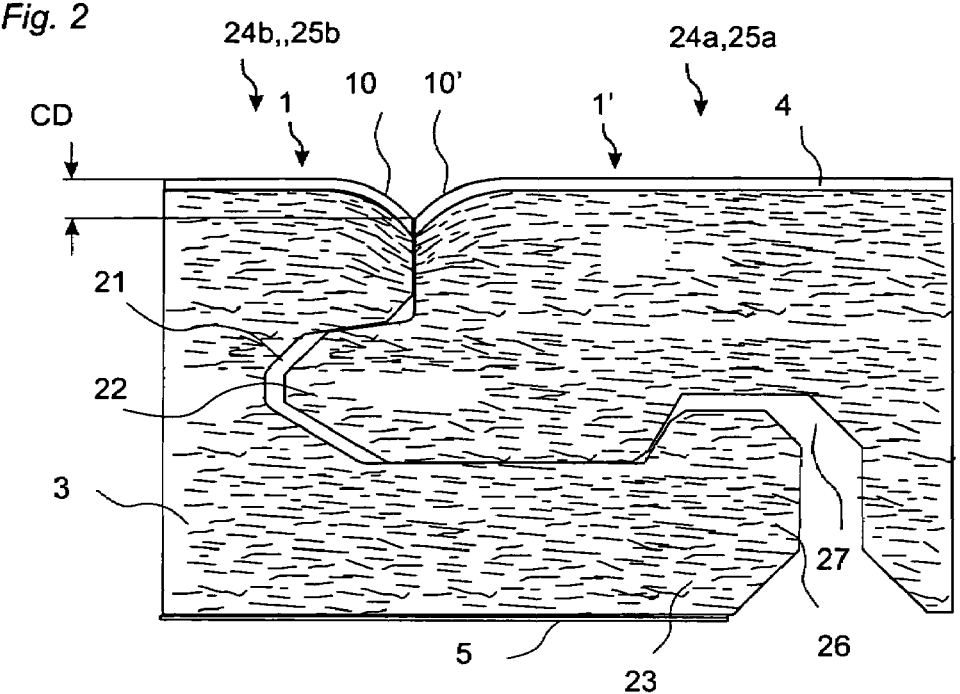
FIGS. 2-3 illustrate an embodiment of a building panel according to the invention.
Figure 3:
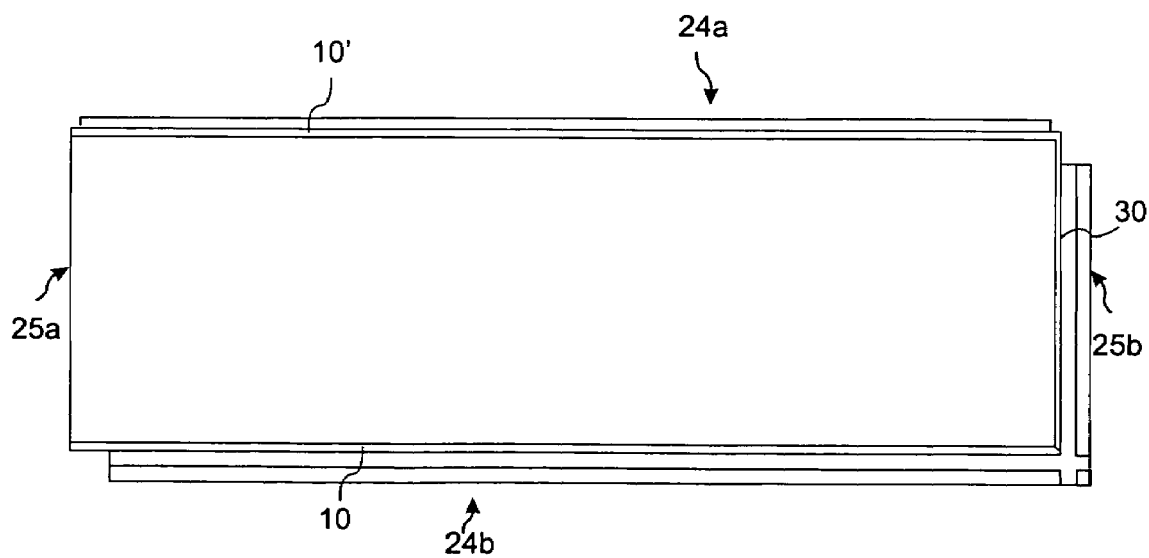

A known device and method of producing a building panel with compressed and curved edges is shown with reference to FIGS. 1a-1c. In FIGS. 2 and 3 an embodiment of a building panel according to the invention is shown, produced by a device and a method according to the invention and provided with a well-known mechanical locking system.

FIGS. 1a-c show in three steps the known method of forming the compressed edge. In FIG. 1a a building element is shown, which in a later step, FIG. 1b, is cut in to two buildings element (2, 2') and provided with an edge groove 5 (6, 6'). The building element comprises a core (3), of a wood fibre based material, preferably HDF, MDF or particle board, a decorative surface (4) of a wood veneer, a laminate comprising paper sheets and a resin or a decorative printing and a balancing layer (5). A mechanical locking system, which will be produced at a later stage, is indicated by a dotted line. In the second step heat is applied to the edges by a heat device (8). In the third step, illustrated in FIG. 1c, a press tool (9) compresses the core at the edge of the building panel and forms the curve shape (10, 10').

In FIG. 2 an embodiment of the invention comprising a joint between two floor panels (1, 1') with the compressed and curved edges (10, 10') is shown. An example of a mechanical locking system is shown for vertical and horizontal locking. The horizontal locking comprises a locking strip (23), extending horizontally from a edge (24b, 24b) of a first floor panel (1) and provided with an upwardly projecting locking element (26), which cooperates with a locking groove (27) under and at the edge (24a, 25a) of a second floorboard (1') The vertical locking comprises a tongue (21) at the edge (24b, 25b) of the first panel and a tongue groove (21) at the edge (24a, 25a) of the second floor panel (1'). Any type of locking may be used, e.g. only vertical, only horizontal, a tongue lock (see WO02/055810) or in addition glue may be added.

FIG. 3 shows an embodiment of the floor panel provided with the mechanical locking system and curved edges (10, 10') at a long edges and a decorative groove (30) at only one of the opposite short edges (25a, 25b).

Figure 4:
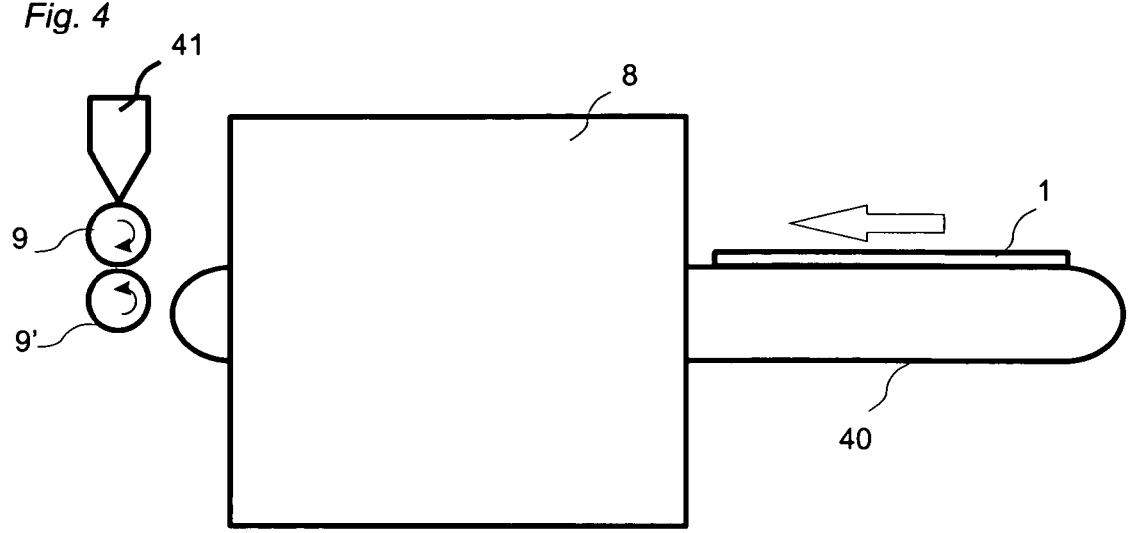
FIG. 4 illustrates an embodiment of the device and method according to the invention
Figure 5:
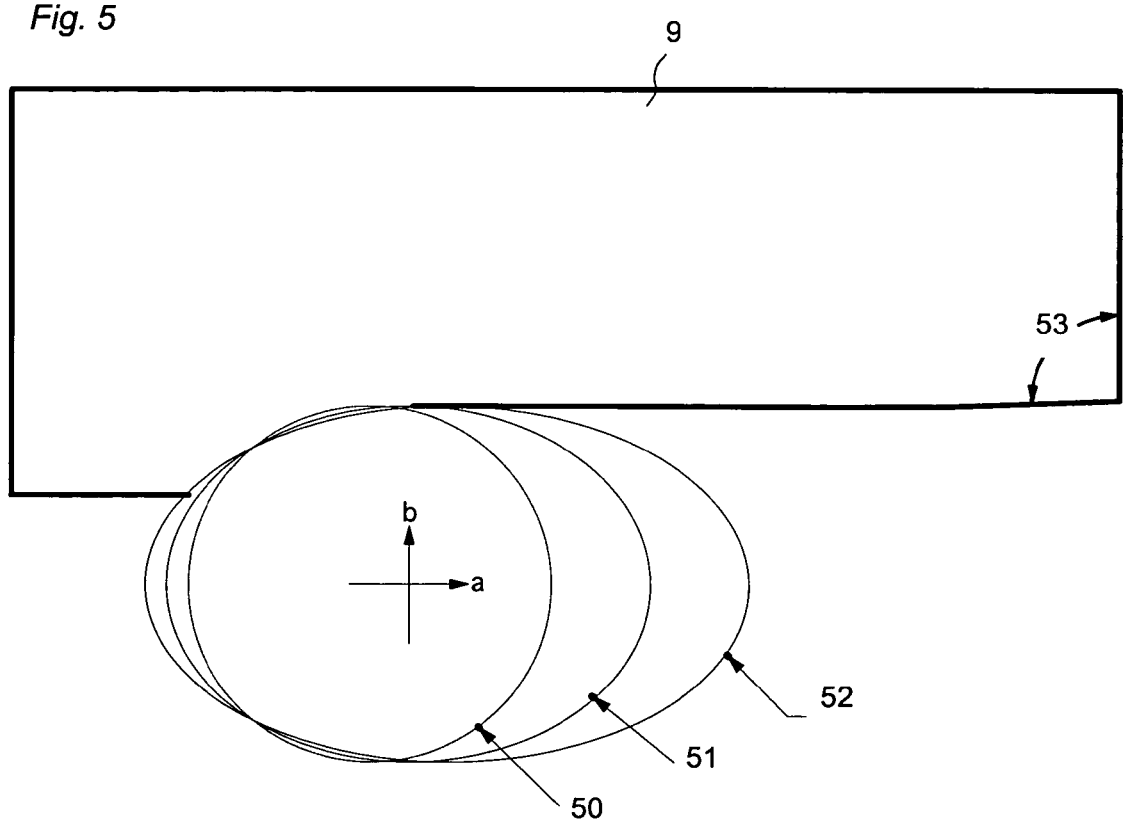
FIG. 5 illustrates an embodiment of the press tool according to the invention, for compressing and forming of an edge portion of a building panel.

An embodiment of the device and method according to the invention is illustrated in FIG. 4. The device comprising a conveyor (40) for moving a building panel (2) to a heat device (8). The heat device, e.g. infra-red heat element, is arranged for heating an edge of the building element. In a second step the conveyor moves the building panel to a press tool for compressing the edge of building panel. Preferably both opposite edges are heated and subsequently compressed at the same time by a rotating press tool. The device also comprises a lubricating device (41) arranged for applying a lubricate additive, preferably to the press tool or to the edge of the building panel.

A preferred lubricate additive is a synthetic teflon oil, but it is also possible to use a mineral and a organic oil with the same fluid and lubricating properties, which is possible to remove from the decorative surface. To reduce the friction further more, the surface of the press tool (9) may be grinded and/or tempered. As an example a material of tempered steel with a hardness of about 30-40 HRC may be used for the press tool, which may be tempered by nitro-carburizing to about 60-70 HRC and advantageously grinded to a roughness of about 0.2 Ra. Other method may be used for tempering for which a hardness may be achieved of about 30004000 Vickers. Generally, a harder and smoother press tool is desired, but leads to greater costs. For some material of the decorative layer and a compression in the lower range, it's possible to take out the lubrication and achieve the desired result by a grinded and tempered press tool.

Advantageously, the press tool (9) may be provided with a groove with a circular (50) or an elliptic shape (51, 52), which creates a corresponding circular or elliptic shape of the curved edge of the building panel. With an elliptic shape a visual effect is created that the curved edge looks deeper, if the radius of the ellipse in a direction (a), parallel to the decorative surface is larger than the radius of the ellipse in a direction (b), vertical to the decorative surface. The edge of the tool closest the middle of the building panel is preferably provided with a clearance angel (53).

The embodiment of the building panel shown in FIG. 2, produced by the aforementioned device and method according to the invention preferably comprises a core of a wood based material, e.g. HDF or MDF and a decorative layer of a laminate comprising paper sheets and a resin or a decorative printing, which combination is suitable for compression. Also other types of wood based cores, e.g. particle board or plywood and other decorative surface may be used, e.g. veneer. Advantageously, the building panel is provided with a balancing layer (5).

Advantageously, the core at the curve shaped edge is compressed more than 0.5 mm and most preferably more than 0.7 mm. A preferred range of compression is between 0.5 mm to 1 mm. Also a smaller degree of compression is obviously possible, and even a larger, but a curved edge or bevel in this range looks the most natural. With the method and the device according to the invention a building panel with such a deep compression is possible to achieve without cracks in the decorative surface. The compressed edge may also comprise a straight part.

The invention claimed is:

1. A system for producing a building panel with a compressed and curved edge portion, the system comprising:
   a heating device arranged to heat an edge of the building panel,
   a press tool arranged to compress a core of the building panel at the edge of the building panel,
   a lubricate additive including grease or oil, and
   a lubricating device for supplying the lubricate additive where the panel is intended to be compressed and configured to decrease the friction between a decorative surface of the curved edge portion and the press tool resulting in fewer or no cracks in the decorative surface.

2. The system as claimed in claim 1, wherein the lubricate additive is supplied to the press tool.

3. The system as claimed in claim 1, wherein the lubricate additive is supplied to the edge of the building panel.

4. The system as claimed claim 1, wherein the press tool is rotatable and is configured to rotate when applying pressure on the edge of the building panel.

5. The system as claimed in claim 1, wherein the lubricate additive is a teflon oil and said lubricating device supplies the teflon oil where the panel is compressed.

6. The system as claimed in claim 1, wherein the heating device comprises an infrared heat element.

7. The system as claimed in claim 1, wherein the heating device comprises a press tool-heating device.

8. A system as claimed in claim 1, wherein the press tool comprises a groove with an elliptic or circular shape, with a larger radius in a plane parallel to the decorative surface of the building panel and a smaller radius in a plane vertical to a decorative surface.

9. The system as claimed in claim 1, wherein the surface of the press tool is ground.

10. The system as claimed in claim 1, wherein the surface of the press tool is tempered.

11. The system as claimed in claim 1, wherein the core comprises HDF or MDF and said press tool is arranged to compress the HDF or MDF at the edge of the building panel.

12. The system as claimed in claim 1, further comprising a decorative surface that is a wood veneer or a laminate layer comprising a resin.

13. The system as claimed in claim 1, wherein a surface of the press tool directly contacts the edge of the building panel and said surface of the press tool is tempered.

14. The system as claimed in claim 1, wherein a surface of the press tool directly contacts the edge of the building panel and said surface of the press tool is ground.

15. The system as claimed in claim 1, wherein the lubricate additive consists of a grease or oil.

\* \* \* \* \*